Oct. 30, 1956 C. W. VOLZ 2,768,464
BAIT CASTING DEVICE
Filed Dec. 5, 1951 2 Sheets-Sheet 1
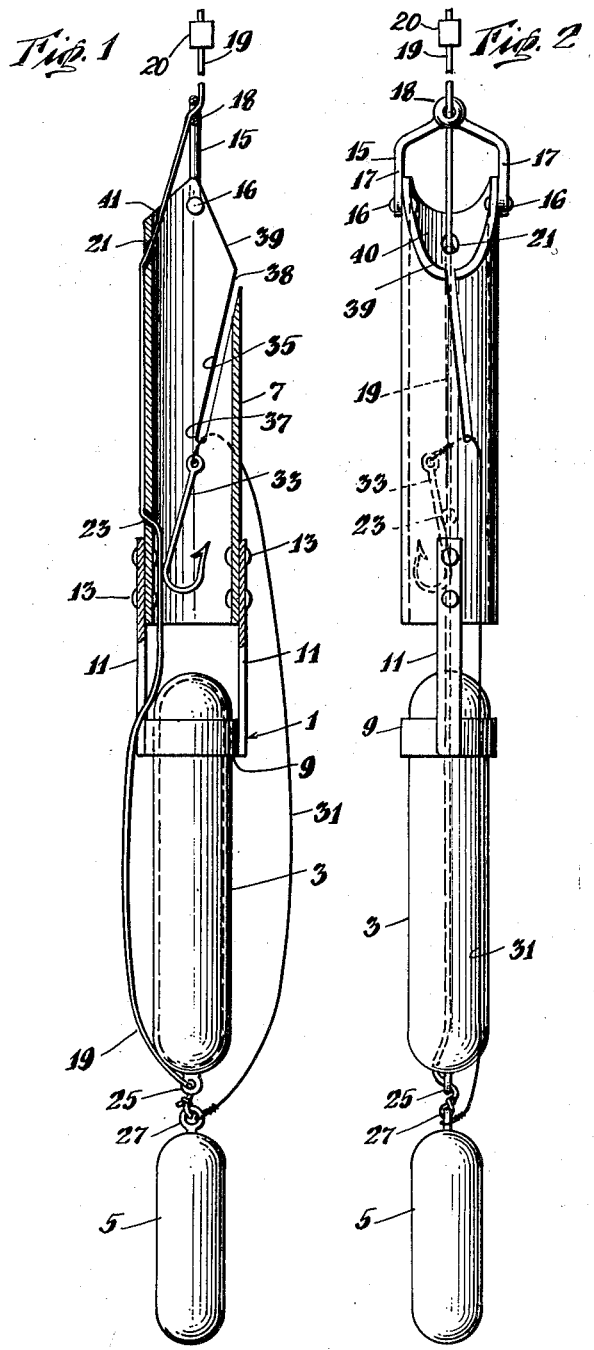
INVENTOR.
Carl W. Volz
BY
George H. Corey
ATTORNEY

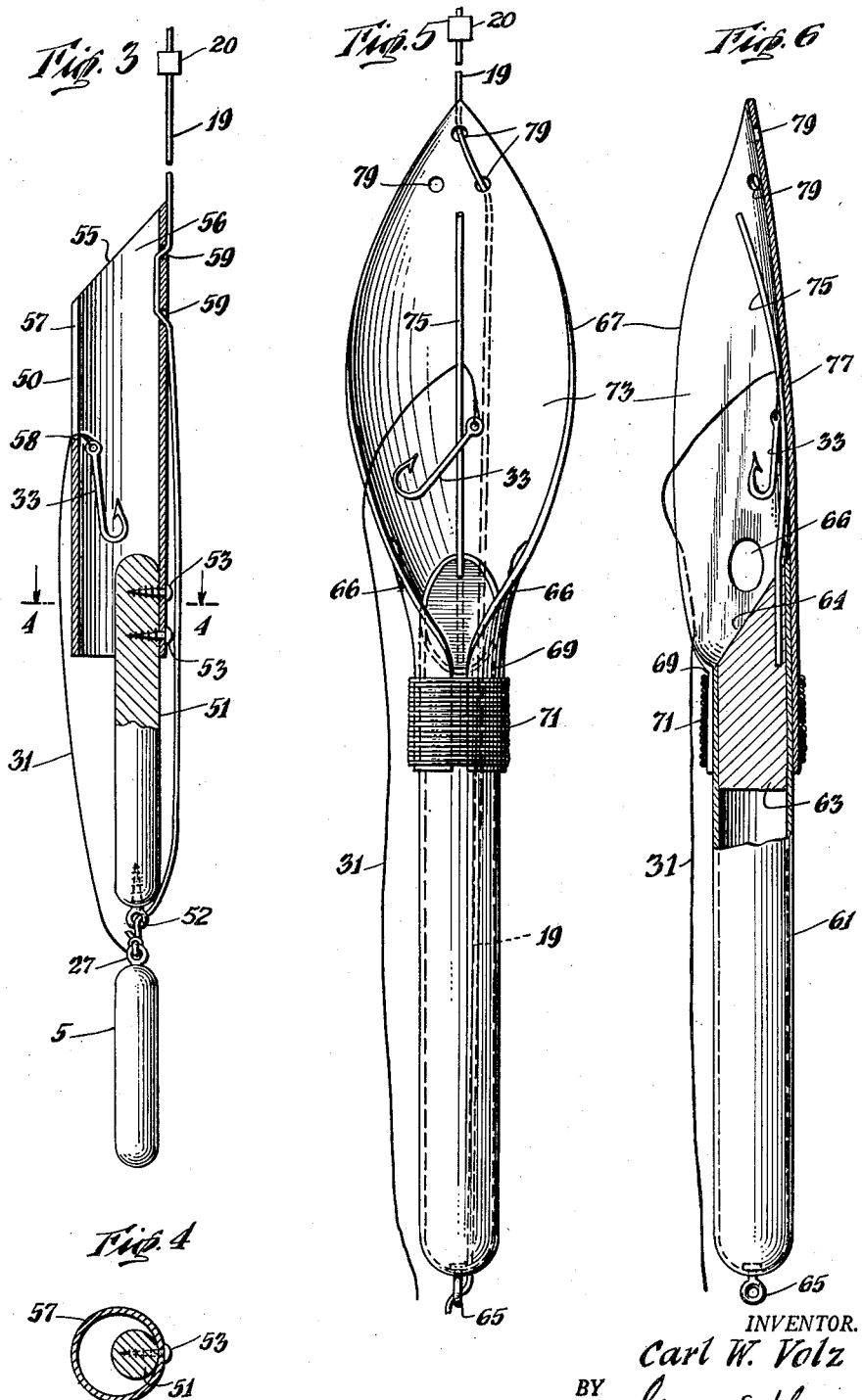

2,768,464

BAIT CASTING DEVICE

Carl W. Volz, Scarsdale, N. Y.

Application December 5, 1951, Serial No. 259,919

10 Claims. (Cl. 43—41.2)

This invention relates to fishing tackle and more specially to a bait casting device having a protector for protecting during the cast live bait carried upon the hook. The invention particularly relates to such a protector adapted to be attached to a bobber or float for cooperation therewith and with a sinker in casting and retrieving the device.

A bait casting device of this character should protect the bait against being torn from the hook by the air or by the quick acceleration when casting at a high velocity to secure a long cast. To this end the device should not only give mechanical support to the bait but should have low resistance to movement through the air. It should, moreover, be of such form as to prevent or minimize catching of weeds and floating debris when retrieving the device for rebaiting or for other purposes. The form and the arrangement with respect to the line and the casting rod should be such that the fish when hooked and brought to boat or to land may be reached by the angler's free hand and, further, so that tangling of hook, sinker, bobber and protector with the line as well as contact of the fish with such parts of the tackle are prevented. The device also should be simple and provide for easy assembly and quick baiting of the hook and insertion of the baited hook in the protector.

The devices heretofore proposed have failed to provide one or more of these desirable or necessary characteristics in a bait casting device provided with a bait protector. While some of such devices may adequately protect the bait during casting thereof the highly important characteristic that the device should have proper aerodynamic form for easily making long casts in which the device must attain a high velocity has not been provided nor have the devices been of such form in all cases as to prevent wandering from the straight line in retrieving through the water and to avoid catching of weeds and floating materials. Moreover, the devices heretofore proposed have not provided for easy disengagement of the baited hook from the protector and the desired disposition of the bobber, sinker and baited hook respectively one above the other when the device is in floating position in the water. The disposition, moreover, should be such that the fish when hooked and being brought to boat or to land or in being lifted from the water shall not come in contact with the bobber or the bait protector.

It is an object of the invention to secure the desirable or necessary characteristics above referred to in a bait casting device provided with a protector while avoiding the objectionable features of the devices heretofore known.

It is a further object of the invention to provide a protector attached or attachable to a bait casting device which will cooperate with the bobber to secure the desired characteristics.

It is a still further object of the invention to provide a bait casting device of suitable aerodynamic and hydrodynamic form and arrangement which will facilitate both casting and retrieving while preserving the preferable or necessary arrangement of the bobber, sinker and hook for successful angling.

It is an important feature of the invention that the bait protector is adapted to be carried by the bobber at the end of the bobber opposite to that from which the sinker is suspended. In accordance with the invention both the bobber and the protector are of relatively light weight and of elongated form and are in aligned relation with each other so that the device is of arrow like character producing reduced air and water resistance in casting and retrieving, the sinker being the weighted end or the "head" of the arrow and the bobber and protector acting as "shaft" and "feathers."

In cooperation with this assembled device the hook is fastened at one end of a short piece of line or a leader which is connected at its other end to the sinker. The hook when baited is placed in position on the protector as more fully described hereinafter. The line extending from the tip of the rod in the hand of the angler engages the end of the protector opposite to that at which the protector is attached to the bobber and continues along the device to engage the end of the bobber opposite to that at which the protector is attached thereto. The end of this line is attached to the sinker. The engagement of this line with the protector and with the bobber is such as to provide for relative movement of these two connected members lengthwise with respect to the line. This permits the sinker to be drawn up close to the bobber preparatory to casting. The sinker also may carry the line as well as the baited hook and its leader downwardly in the water from the bobber when the device is floating at the surface of the water upon completion of the cast, thereby to dispose the hook in its desired position beneath the bobber and at the proper depth below the surface of the water.

Means, however, are provided for resisting movement of the protector and of the bobber connected thereto by their inertia away from the sinker as the sinker moves through the air at high velocity. As the bobber and protector acting as "shaft" and "feathers" of the arrow are light weight, this may be accomplished by sufficient frictional engagement of the line with the protector, such frictional engagement, however, being insufficient to prevent the movement of the sinker downwardly to the desired position in the water when the device is floating as above mentioned.

It is another important feature of the invention that the protector is so formed and arranged in connection with the bobber that the baited hook may be firmly supported thereby during the cast, the protector preferably being of such form as to extend about a space within which the hook is disposed so that the bait is protected against the full force of the air through which it moves at high speed. On the other hand, when the device has reached the water at the end of the cast, because of its elongated form it will float with its length generally horizontal, at least the bobber having the buoyancy to support the protector and the sinker. The protector in accordance with this feature of the invention engages the baited hook or the leader connected thereto in such a way that in this horizontal floating position the sinker, as it moves downwardly through the water to draw the line relative to the bobber and the protector as above mentioned, may reach a position in which it can draw the leader and the hook connected thereto from the protector. Thereafter the baited hook may sink in the water or may become disposed more or less horizontally out from the sinker, if there is any current in the water, in the desired position for fishing.

It is a further feature of the invention that upon such release of the baited hook from the protector the sinker, having reached its desired position below the floating device, will pull the adjacent end of the bobber down in the water so that the bobber will float in a generally upright or vertical position. Preferably the weight and buoyancy of the parts are such that the protector extends more or less above the water. To secure such pull of the sinker it is merely necessary to provide a knot in the line, or other stop means suitably positioned therealong between the protector and the rod, which will be drawn down by the sinker to engage the adjacent end of the protector, thereby to suspend the sinker in the water by virtue of the support of the floating bobber. The protector thus may serve as a flag indicating, even at long distance to which the device may have been cast or to which it may have been carried by a current, the position of the floating bobber.

Other features will be understood from the description of the drawings to follow in which:

Fig. 1 shows partially in section and partially in elevation one embodiment of the invention.

Fig. 2 is an elevation of the device of Fig. 1 as viewed from the right in Fig. 1.

Fig. 3 shows partially in section and partially in elevation a modification of the device of the invention.

Fig. 4 is a horizontal section on line 4—4 of Fig. 3.

Fig. 5 is a front elevation of a further modification of the device of the invention.

Fig. 6 shows partially in section and partially in elevation the device of Fig. 5 as viewed from the right in Fig. 5.

In Fig. 1 the bait casting device 1 comprises a bobber 3 of elongated form. This bobber in the embodiment shown in Fig. 1 is in the form of a hollow cylinder of circular section provided with spherical ends. The bobber 3 may be made of metal of thin wall section and of such dimensions as to length and diameter as to be suitable for a particular type or perhaps of several types of fishing. The dimensions of the bobber are such, having regard to the buoyance secured by means of the hollow body 3 which is made water-tight, that it is capable of supporting the sinker 5 and, as well, the protector 7. The protector 7 may be made of light weight material while providing sufficient rigidity for carrying the baited hook and for protecting the bait against mechanical displacement and the action of the air through which it travels at high speed.

In the embodiment of Figs. 1 and 2 the protector 7 is supported upon the bobber 3 by a ring 9 which may be fastened to the bobber 3 exteriorly thereof by suitable means, such as cementing or welding. To the ring 9 are attached by welding or other means supporting legs 11 which may be fastened, as by rivets 13, to the wall of the protector 7. The ring 9 and the legs 11 rigidly support the protector 7 of elongated form. In the embodiment of Figs. 1 and 2 the protector 7 is a tube of circular cylindrical section in axial alignment with the axis of the bobber 3.

At the end of the protector 7 opposite that at which it is supported upon the bobber 3 a bail 15 is attached by pivot pins 16 providing for movement of the bail on the axis of the pivots. In some cases, however, rivets may be substituted for the pivot pins 16 to fix the bail 15 in the position shown. The legs 17 of the bail 15 are connected at their outer ends to an eyelet 18 through which the line 19 leading from the rod passes.

As shown in Figs. 1 and 2 the line 19 then passes through an opening 21 formed in the wall of the protector 7. This opening is inclined at an angle to the axis of the protector 7. The line then passes through an opening 23 in the wall of the protector and thence along the bobber 3 to an eyelet 25 at the end of the bobber opposite to the end thereof at which the protector 7 is supported. The line 19 after passing through the eyelet 25 is attached to an eyelet 27 fastened in the sinker 5. These openings and eyelets may have their surfaces rounded and smooth to avoid chafing the line. The angles at which the openings 21 and 23 are formed are such that frictional engagement of the line with the surfaces of these openings and with the wall of the protector is secured which will resist movement of the protector and the bobber connected thereto away from the sinker as the sinker acting as the "head" of the arrow leads the bobber and protector in flight through the air during casting. Since the bobber and protector are of relatively light weight only a relatively small frictional resistance is necessary to insure that the bobber and protector will be drawn behind the sinker in such flight.

When the device of Figs. 1 and 2 reaches the water it will tend to float in the generally horizontal position because of the elongated form of the bobber. If the protector is made of material which is of the same density as or lighter than water this horizontal floating position also will be secured. As above generally described, however, the frictional resistance provided by the openings 21, 23 and 25 is insufficient to prevent the line being drawn through these openings by the sinker 5 as the device thus floats horizontally. In this position of the device the sinker moves downwardly until a knot or other stop means 20 carried by the line 19 between the eyelet 18 and the rod at the proper distance from the eyelet 18 engages eyelet 18, the sinker prior to the cast having been drawn up to the eyelet 25. Engagement of the eyelet 18 by the stop 20 prevents further downward movement of the sinker. The sinker then will draw the adjacent end of the bobber 3 downwardly so that the bobber floats in a generally upright position, thereby lifting the protector 7 from the water and holding it upright to serve as a flag as above referred to.

As shown in Figs. 1 and 2 the leader 31 is fastened to the eyelet 27 of the sinker 5 and is fastened at its opposite end to the hook 33 disposed within the cylindrical space of the protector 7. The leader 31 is only of such length as to reach to the hook from the eyelet 27 of the sinker when this eyelet is immediately adjacent the eyelet 25 of the bobber while the leader passes through a slot 35 cut in the wall of the protector 7. The length of the leader thus passing through the slot is such that it is disposed adjacent the end 37 of the slot toward the bobber 3. To facilitate withdrawal of the leader 31 from the slot 35 and the baited hook 33 from within the protector 7 in the manner about to be described, the slot 35 in the embodiment of Figs. 1 and 2 is cut at an acute angle to the lengthwise axis of the protector 7. This slot extends from the inner closed end 37 thereof to an open end 38 at an edge 39 of the protector.

During the period in which the bobber and protector are floating horizontally and the sinker is moving downwardly sufficient length of the line 19 becomes disposed below the eyelet 25 to allow the sinker to become disposed beneath the protector 7, the line 19 then extending at an angle from the eyelet 25 to such position of the sinker which has moved in an arc having a radius substantially equal to the length of the leader 31. Moreover, the sinker now may effect a pull upon the leader 31 to withdraw it along the inclined slot 35, thereby to draw the baited hook along the space within the protector 7 and out through the end thereof which is formed by the inclined edge 39 and between the legs 17 of the bail 15. When the sinker thus has withdrawn the baited hook from the protector, the hook may sink in the water or move outwardly from the sinker if carried by a current. The knot or other stop means 20 is so adjusted on the line 19 as thereupon to engage the eyelet 18 and the bobber and protector under the pull of the sinker assume the upright floating position above described.

It will be noted that the bail is attached to the protector by pivot pins 16 so as to effect a pull on the protector along the axis thereof. Thus in retrieving the device will be drawn through the water without deflection from its true course toward the rod. In order to prevent catching of weeds or floating debris the edge 39 is formed at an incline to the axis. The edge 41 at the opposite side of the bail also is formed at an incline which may be the same as or greater or less than that of the edge 39 depending upon the conditions of fishing to be met and the size of the hook and bait to be used.

It will be noted that the sinker 5 may be drawn up close to the bobber, leaving no appreciable portion of the line 19 therebetween and with only the leader 31 extending below the sinker when the hook is freed from the protector. Although the protector and bobber are of elongated form and are in alignment with each other, the length of the line and tackle including the length of the leader which it is necessary to leave suspended from the end of the rod may be relatively short and only sufficient to enable the angler easily to reach the fish with his free hand or with a net when brought to boat or to land. Moreover, it is apparent that the fish thereby is disposed or becomes suspended entirely beyond or below the tackle and does not come in contact therewith either when bringing the fish to boat or to land through the water or in lifting the fish from the water.

In preparing the device for casting the line may be reeled in until the stop means above referred to on the line reaches the tip of the rod or reeling may be stopped before the tip is thus reached to dispose the sinker at a suitable distance from the tip for casting. If necessary, however, by using a suitable stop or in many cases merely a knot in the line this stop or knot may be reeled in past the tip to shorten the amount of line and gear depending from the tip for casting. The bobber 3 and the protector 7 attached thereto then are moved along the line until the eyelet 25 of the bobber engages the eyelet 27 of the sinker. The hook 33 then is baited and the baited hook is inserted through the opening 40 at the outer end of the protector 7 over the edge 39 thereof, the leader 31 being inserted in the slot 35 at the open end 38 thereof so that the hook may become disposed in the position shown in Figs. 1 and 2.

It is an important feature of the invention that the length of the slot 35 and its disposition in the protector 7 are such in relation to the length of the leader 31 that the hook may be inserted in the protector 7 and the leader entered in the open end 38 of the slot as above described but that when the sinker is in the position shown in Figs. 1 and 2, the slack in the leader 31 is insufficient to allow the baited hook to move along the cylindrical space within the protector 7 or the leader 31 to move any substantial distance along the slot 35 toward the end 38 thereof.

In inserting the baited hook in the protector and in entering the leader in the slot, to the slight slack of the leader may be added sufficient length of the line 19 between the eyelets 25 and 27 to enable such insertion and entry to be accomplished. To this end the sinker 5 may be moved somewhat from the position shown in Fig. 1 and may be drawn back to this position after the hook and leader are in place in the protector. In withdrawing the hook for baiting the requisite slack may be similarly secured by moving the sinker 5 away from the eyelet 25. The length of the slot and the length of the leader, moreover, are such in relation to the lengthwise dimensions of the bobber and protector that, although the leader may be withdrawn in the manner above described from the open end 38 of the slot under the pull of the sinker when the device is floating in the water, the sinker tends to hold the leader extended lengthwise of the device and to prevent movement of the leader along the slot toward the end 38 as the device is cast through the air.

Fig. 3 shows a somewhat simplified modification of the device of the invention in which a tubular protector 50 is attached to a bobber 51 of solid material capable of floating. The protector 50 is fastened to the bobber 51 by screws 53 passing through the wall of the tube, the axis of the tube thereby being offset somewhat from the axis of the bobber. Extending from the inclined edge 55 of the protector 50 at its outer end 56 in this embodiment a slot 57 is provided lengthwise of the protector, the inner end of the slot 58 being disposed toward the bobber 51.

The leader 31 is fastened to the eyelet 27 of the sinker 5 in the manner as described in connection with Figs. 1 and 2, the opposite end of the leader 31 being fastened to the hook 33.

The line 19 in this embodiment extends through two openings 59 positioned in the wall of the protector 50 adjacent the outer end 56 and at the side of the protector at which the bobber is fastened, these openings 59 providing for frictional engagement as above described in connection with Figs. 1 and 2. The line 19 continues along the device and through the eyelet 52 screwed into the end of the bobber 51 opposite to that at which the protector 57 is attached. The pull of the line, although not strictly along the axis of the protector and bobber as in Figs. 1 and 2, is close to the axis of the bobber and, having regard to the endwise general alignment of bobber and protector as shown and the disposition of the sinker at the opposite end of the bobber from the protector, the arrow like form is preserved and a form adapted for substantially straight line retrieving is secured. The device of Figs. 3 and 4 is intended to be generally proportioned and to function in the same manner as described in connection with that of Figs. 1 and 2.

In Figs. 5 and 6 is shown another modification of the device of the invention. In this modification, a bobber 61 which may be of metal or plastic or other suitable material is of hollow form closed at its end by a stopper 63. The opposite end of the bobber 61 may be of spherical form molded or drawn and cooperating with the cylindrical portion of the bobber to provide a water tight shell, the stopper 63 being made water tight to the cylindrical wall of this shell by any suitable means. At the spherical end of the bobber an eyelet 65 similar to the eyelet 25 is provided which may be riveted in the wall of the spherical end or otherwise fastened therein and made water tight thereto.

The protector 67 is supported at the stoppered end of the bobber 61. In this embodiment, the protector is made of sheet material which may be a plastic or sheet metal or other suitable material. The protector 67 may be cut from this sheet in a suitable pattern to provide the portion 69 thereof which may be bent closely around the circumference of the cylinder of the bobber 61 and may be wrapped about by the line or cord 71 for holding the portion 69 of the protector in close contact with the bobber 61. The wrapping 71 may be made in the conventional manner and may be held with water resisting cement or varnish as is usual for such holding means in fishing tackle. Preferably in the device of the invention this wrapping is disposed about the stopper 63 which gives support internally to the bobber wall and to the portion 69 of the protector.

It will be noted that the pattern of the protector 67 is such that when the portion 69 is bent about the bobber 61 a cavity 73 having a depth as shown in Fig. 6 and open at one side as shown in Figs. 5 and 6 is provided within which may be disposed the hook 33. For retaining this hook in place a spring wire clip 75 formed as shown in Fig. 6 is supported by the stopper 63 with the end of the spring wire thrust into or molded in the material of the stopper. In order to provide lightness and to receive the end of the clip 75 the stopper may be made of cork or similar light penetrable material capable of resisting compression. The spring clip 75 is disposed adjacent that side of the stopper which is toward the back of the cavity 73 and in bearing relation to the wall 77 of the protector 67. The leader 31 extending from the sinker (not shown) in the same manner as described in connection with Figs. 1 and 2 may be brought behind the clip 75 so as to be gripped thereby and to hold the hook in the position shown in Figs. 5 and 6. In order to avoid or minimize catching of weeds or debris the protector 67 is tapered at its outer end in the manner shown in Fig. 6 and the edges thereof sweep in curves from this pointed end along the edges of the cavity 73 to the portion 69.

Adjacent its pointed end the protector 67 is provided with openings 79 through one or more of which the line 19 may be threaded to secure frictional resistance to movement of the protector and the bobber fastened thereto in relation to the line 19 during casting. As shown in Fig. 5 the line 19 is carried along the protector and along the bobber 61 to the eyelet 65 through which it is threaded, a sinker being attached to the line below this eyelet in the manner and for the purposes described in connection with Figs. 1 and 2. The device of Figs. 5 and 6 will therefore function in the same manner as described in connection with Figs. 1 and 2 both as the device is cast and as it floats upon completion of the cast.

It will be noted in connection with the devices of Figs. 1 and 2 and of Fig. 3 that the protectors 7 and 57 of tubular form are open at the ends to permit movement of air and water through the internal spaces thereof. While such movement of both air and water through these tubes may take place and it would seem that undesirable action on the bait within the protector may develop therefrom, nevertheless it is found that the desired protection of the bait against the forceful action of the air in casting is secured while at the same time the resistance to movement of the device through the air and the water is greatly reduced because the end edges of the walls of the tubes present a relatively small area to the air and water through which the device is rapidly moved in casting and retrieving. This area may be not greater than or may be less than that of the bobber. Also, because of the elongated shape of the bobber, it will be apparent that this part of the device presents a minimum of resistance to the air and water while providing sufficient cross section to secure the necessary buoyancy of the device. It is desirable likewise that the sinker 5 be of elongated form as shown in Figs. 1, 2 and 3 to minimize the resistance of the air.

The elongated form of the protector, as well as the restricted cross section of the bobber and the sinker reduce the chance of catching weeds and debris in retrieving the device through the water. In the device of Figs. 1 and 2 the pull of the line is substantially along the axis of the device and, having regard to the sloped edges 39 and 41 of the protector serving to deflect any solid material encountered, a low resistance to the pull of the line as it is reeled in is produced, both in clear water and among weeds and debris. The form is such, moreover, that the device is not deflected to wander from a straight line in retrieving or from a uniform trajectory in casting.

The device of Fig. 3, although not of a form fully symmetrical about a lengthwise axis as that of Figs. 1 and 2, nevertheless is of such form that the pull of the line 19 is generally closely along the axis of the bobber and sinker. Since the protector 57 is of light weight the offset relation of this protector with respect to the bobber, as shown, in many cases is not disadvantageous. A simple device thereby is secured in which the sloping edge 55 serves for deflection of weeds and debris.

It will be apparent also in the device of Figs. 5 and 6 that substantially axial pull is secured by virtue of the curved contour of the wall 77 of the protector 67 which develops because of the bending of the portion 69 about the circumference of the bobber 61, the tapered end of the protector adjacent the holes 79 being thrown to the position adjacent the center line of the device.

In this device also the air and water do not develop resistance as would be the case if a solid surface of substantial area transverse to the line of movement were presented to the air and the water. As the cavity 73 is open at one side, the adjacent end surface 64 of the stopper 63 being sloped as shown, the water entering the cavity may be guided along this end surface 64 outwardly of the cavity with relatively little resistance. To aid in relieving the pressure resisting movement of the water in retrieving relatively large openings 66 are provided in the wall of the protector 67 adjacent the sloping end 64 of the stopper through which the water also may flow out of the cavity 73.

Although in the embodiments illustrated in the drawings bobbers of cylindrical form are shown as the preferred type, these bobbers may be of other cross sections while generally preserving the elongated form for minimizing resistance to air and water and for securing initial floating in the horizontal position upon completing the cast and the upright position of floating when the sinker draws the adjacent end of the bobber downward. Similarly, the protectors may be of different cross sections and shapes while formed to facilitate movement of air and water therethrough or thereby with relatively small resistance and, on the other hand, without forceful action on the bait carried by the hook.

Materials which themselves are lighter than water, or if of the same density or heavier than water which are capable of being formed as hollow buoyant rigid members, are suitable for the bobber or float of the invention. Materials which are of sufficient rigidity and strength and capable of being formed as tubes or bendable sheets or otherwise capable of being fabricated for attachment to the bobber may be used for the protector. These materials for the bobber and protector, however, preferably are of not greater density or are lighter than water. Nevertheless, by suitably designing the bobber as a rigid buoyant body and using thin gauge material for the protector, either or both of these members may be made of metal or other material heavier than water. It is advantageous to use materials of brilliant colors or combinations of colors for the protector serving as a flag and, if desired, for the bobber or to apply colored coatings to these parts to increase the visibility thereof.

Other modifications and substitutions will be apparent to those skilled in the art without departing from the essential features of the invention as above described and as defined in the appending claims.

I claim:

1. A bait casting device with leading and trailing ends relative to its flight during casting comprising a bait-hook, a sinker, a leader connecting said hook to said sinker, an elongated float, an elongated bait-hook protector extending lengthwise behind and connected endwise to the trailing end of said float, said protector having a wall extending lengthwise of said protector and extending about a bait hook receiving space, said wall being provided with leader-engaging means extending longitudinally therealong and adapted to engage a part of the leader intermediate the ends thereof, said leader-engaging means being open toward the trailing end and closed toward the leading end of said protector so as to hold said bait-hook within said space in close association with said protector during casting while providing for releasing movement of said leader toward the trailing end of said protector on completion of a cast, a line attached to said sinker, and means carried by said float adjacent its free and leading end for providing threading engagement of said line attached to said sinker.

2. A bait casting device as defined in claim 1 in which said bait-hook protector is provided with means for frictionally engaging a portion of said line for resisting movement of the line relative to said protector under pull of the sinker tending to produce a separating movement of said sinker relative to said float so as to hold said sinker adjacent the free end of said float during casting.

3. A bait casting device with leading and trailing ends relative to its flight during casting comprising an elongated float, an elongated bait-hook protector extending lengthwise behind and connected endwise to the trailing end of said float, said protector having a wall extending lengthwise of said protector and extending about a bait hook receiving space, said wall being provided with leader-engaging means extending longitudinally therealong, said leader-engaging means defining a narrow passage open toward the trailing end and closed toward the leading end of said protector, and line-engaging means provided adjacent the leading end of said float.

4. A bait casting device as defined in claim 3 in which said leader-engaging means comprises portions of said wall defining a slot in said wall open toward the trailing end and closed toward the leading end of said protector.

5. A bait casting device as defined in claim 3 in which said bait-hook protector is additionally provided with frictional line-engaging means.

6. A bait casting device as defined in claim 5 in which said line-engaging means provided by said protector comprises portions of said protector wall defining a plurality of openings in the protector wall for engaging the line passing through said openings.

7. A casting element with leading and trailing ends relative to its flight during casting comprising an elongated bait-hook protector and float-connecting means at the leading end of said protector, said protector having a wall extending lengthwise of said protector and extending about a bait hook receiving space, said wall being provided with leader-engaging means extending longitudinally therealong, said leader-engaging means defining a narrow passage open toward the trailing end and closed toward the leading end of said protector.

8. A casting element as defined in claim 7 in which said leader-engaging means comprises portions of said wall defining a slot in said wall open toward the trailing end and closed toward the leading end of said protector.

9. A casting element as defined in claim 7 which is additionally provided with frictional line-engaging means.

10. A casting element as defined in claim 9 in which said line-engaging means comprises portions of said protector wall defining a plurality of openings in the protector wall for engaging the line passing through said openings.

References Cited in the file of this patent

UNITED STATES PATENTS

| | | |
|---|---|---|
| 1,128,205 | White | Feb. 9, 1915 |
| 2,260,705 | Eguchi | Oct. 28, 1941 |
| 2,292,743 | Cordry | Aug. 11, 1942 |
| 2,531,418 | Fitzharris | Nov. 28, 1950 |
| 2,554,318 | Wardrip et al. | May 22, 1951 |